(12) United States Patent
Townsend et al.

(10) Patent No.: US 11,747,113 B2
(45) Date of Patent: Sep. 5, 2023

(54) SYSTEM AND METHOD OF MANAGING A PROJECTILE MODULE ON A FLYING DEVICE

(71) Applicant: FORTEM TECHNOLOGIES, INC., Pleasant Grove, UT (US)

(72) Inventors: Eric Christopher Townsend, Provo, UT (US); Matthew Elliott Argyle, Lindon, UT (US); Norman Fong, Draper, UT (US)

(73) Assignee: FORTEM TECHNOLOGIES, INC., Pleasant Grove, UT (US)

( * ) Notice: Subject to any disclaimer, the term of this patent is extended or adjusted under 35 U.S.C. 154(b) by 284 days.

(21) Appl. No.: 17/113,655

(22) Filed: Dec. 7, 2020

(65) Prior Publication Data

US 2021/0116215 A1 Apr. 22, 2021

Related U.S. Application Data

(63) Continuation of application No. 16/176,881, filed on Oct. 31, 2018, now Pat. No. 10,859,346.

(51) Int. Cl.
*F41G 7/00* (2006.01)
*B64C 39/02* (2023.01)
(Continued)

(52) U.S. Cl.
CPC ............ *F41G 7/007* (2013.01); *B64C 39/024* (2013.01); *B64D 1/04* (2013.01); *F41G 3/08* (2013.01); *F41G 3/22* (2013.01)

(58) Field of Classification Search
CPC .................................................. F41H 13/0006
See application file for complete search history.

(56) References Cited

U.S. PATENT DOCUMENTS 4,234,142 A 11/1980 Yost
5,102,065 A 4/1992 Couderc
(Continued)

FOREIGN PATENT DOCUMENTS

EP 0527715 A1 * 2/1993 ............... F41G 5/08

OTHER PUBLICATIONS

"Pogo Pin Catalog"; non author listed; no date listed; retrieved from www.pogo-pins.com on Nov. 14, 2022; Cnomax Technology Co., Limited (HK); Hong Kong, Hong Kong Special Administrative Region, China. (Year: 2022).*

(Continued)

*Primary Examiner* — Bernarr E Gregory

(57) ABSTRACT

A flying vehicle is disclosed with a projectile module or component that contains a projectile for projecting at another flying device. The flying vehicle receives an identification of a target flying device and applies a projectile model which generates a determination that indicates whether a projectile, if fired from the projectile component, the projectile will hit the target flying device. The projectile model taking into account one or more of a wind modeling in an area around the flying vehicle based on an inference of wind due to a tilt of the flying vehicle, a projected path of the target device based on its identification and a drag on the projectile as it deploys from the projectile component. When the determination indicates that the projectile will hit the targeted device according to a threshold value, the flying vehicle fires the projectile at the targeted flying device.

18 Claims, 12 Drawing Sheets

(51) Int. Cl.
- *B64D 1/04* (2006.01)
- *F41G 3/08* (2006.01)
- *F41G 3/22* (2006.01)
- *F41G 3/00* (2006.01)

(56) References Cited

U.S. PATENT DOCUMENTS

| | | | |
|---|---|---|---|
| 5,228,854 A * | 7/1993 | Eldridge | F41G 3/26 455/39 |
| 5,379,966 A | 1/1995 | Simeone | |
| 5,436,832 A | 7/1995 | Bessacini et al. | |
| 5,436,966 A | 7/1995 | Barrett | |
| 5,503,137 A | 4/1996 | Fusco | |
| 5,637,826 A | 6/1997 | Bessacini | |
| 5,831,199 A | 11/1998 | McNulty | |
| 5,898,125 A * | 4/1999 | Mangolds | F41H 13/0006 102/504 |
| 6,120,337 A | 9/2000 | Bautista | |
| 6,626,077 B1 * | 9/2003 | Gilbert | F41H 13/0006 102/504 |
| 6,643,972 B2 | 11/2003 | Prokaski | |
| 6,796,213 B1 | 9/2004 | McKendree | |
| 6,854,374 B1 | 2/2005 | Breazeale | |
| 8,146,193 B1 | 4/2012 | Franzino | |
| 8,176,834 B1 | 5/2012 | Arevalo | |
| 8,267,000 B1 | 9/2012 | Larson | |
| 9,134,099 B2 | 9/2015 | Tseng | |
| 9,435,619 B1 | 9/2016 | Park | |
| 9,581,417 B2 | 2/2017 | Tseng | |
| 9,989,336 B2 | 6/2018 | Purvis | |
| 10,036,615 B2 | 7/2018 | Norris | |
| 10,107,599 B2 | 10/2018 | Norris | |
| 10,113,839 B2 | 10/2018 | Sekiya | |
| 10,197,365 B1 * | 2/2019 | Blyskal | F41H 13/0006 |
| 10,399,674 B2 * | 9/2019 | Goodrich | F41H 11/02 |
| 10,401,129 B2 | 9/2019 | Armstrong | |
| 10,435,153 B2 * | 10/2019 | Klein | F41H 11/04 |
| 10,634,461 B2 | 4/2020 | Norris | |
| 10,852,114 B2 | 12/2020 | Norris | |
| 10,859,346 B2 * | 12/2020 | Townsend | F41G 3/08 |
| 10,926,875 B2 | 2/2021 | Klein | |
| 2002/0134365 A1 | 9/2002 | Gray | |
| 2006/0187610 A1 | 8/2006 | Su | |
| 2006/0207466 A1 | 9/2006 | McNulty | |
| 2006/0225333 A1 | 10/2006 | Park | |
| 2007/0019358 A1 | 1/2007 | Kroll | |
| 2007/0122770 A1 | 5/2007 | Swensen | |
| 2010/0132580 A1 * | 6/2010 | Nazdratenko | F41H 13/0006 124/56 |
| 2010/0315755 A1 | 12/2010 | Gavin | |
| 2011/0011347 A1 | 1/2011 | Ohlman | |
| 2011/0102964 A1 | 5/2011 | Bass | |
| 2011/0220087 A1 | 9/2011 | Gerwig | |
| 2011/0303613 A1 | 12/2011 | Crouse | |
| 2012/0170167 A1 | 7/2012 | Beechey | |
| 2013/0239937 A1 | 9/2013 | Macri | |
| 2014/0045146 A1 | 2/2014 | Otte | |
| 2014/0331984 A1 | 11/2014 | Brahler, II | |
| 2015/0002981 A1 | 1/2015 | Klug | |
| 2015/0168107 A1 | 6/2015 | Tseng | |
| 2016/0010956 A1 | 1/2016 | Hanchett | |
| 2016/0161225 A1 | 6/2016 | Searle | |
| 2016/0293015 A1 | 10/2016 | Bragin | |
| 2016/0376029 A1 * | 12/2016 | Sekiya | F41H 11/02 244/11 OF |
| 2017/0144756 A1 | 5/2017 | Rastgaar Aagaah | |
| 2017/0261292 A1 * | 9/2017 | Armstrong | F41H 11/02 |
| 2017/0276460 A1 | 9/2017 | Norris | |
| 2017/0355461 A1 | 12/2017 | Naito | |
| 2017/0356726 A1 | 12/2017 | Theiss et al. | |
| 2018/0094908 A1 * | 4/2018 | Down | F41H 11/02 |
| 2018/0162530 A1 * | 6/2018 | Klein | F41H 11/04 |
| 2018/0335779 A1 | 11/2018 | Fisher | |
| 2018/0353316 A1 | 12/2018 | Anderson | |
| 2019/0063881 A1 | 2/2019 | Abramov | |
| 2019/0068953 A1 | 2/2019 | Choi | |
| 2019/0088156 A1 | 3/2019 | Choi | |
| 2019/0129427 A1 | 5/2019 | Sugaki | |

OTHER PUBLICATIONS

A. Born, "What are Pogo Pins (Spring-loaded pins)?"; Jun. 28, 2022; posted on the Internet at connectorsupplier.com. (Year: 2022).*
PCT/US19/58443, Outgoing Written Opinion of the ISA, dated Jan. 16, 2020 (Year: 2020).
PCT/US19/58443, Outgoing ISA 210 International Search Report, dated Jan. 16, 2020 (Year: 2020).

* cited by examiner

SYSTEM AND METHOD OF MANAGING A PROJECTILE MODULE ON A FLYING DEVICE

PRIORITY INFORMATION

The present application is a continuation of U.S. patent application Ser. No. 16/176,881, filed Oct. 31, 2018, now U.S. Pat. No. 10,859,346, the content of which is included herein in its entirety.

TECHNICAL FIELD

The present disclosure relates to a targeting and projectile deployment system used on a flying device to immobilize other flying devices. The system applies a projectile model that predicts whether the projectile will hit a target device and fires the projectile based on the result of the projectile model.

BACKGROUND

Although drone technology has been around for half a century, high production costs and older technology limited owners of large and bulky drones to include mostly that of military or special interest groups. Advancements in drone technology reduced the price and size of drones, eventually making them more readily available to individual consumers. With an increase in consumer drones, problems began to surface regarding privacy, trespassing and security issues.

As drones are able to fly at high altitudes, it is extremely difficult to remove an unwanted drone from a designated property. Also, many drones are able to carry a payload, which raises security issues concerning hostile applications such as carrying and deploying an explosive or harmful chemical agent. Not being able to remove or eliminate potentially threatening drones can be a major problem for governments, event planners, or any land owner.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Brief Introduction

Figure 1:
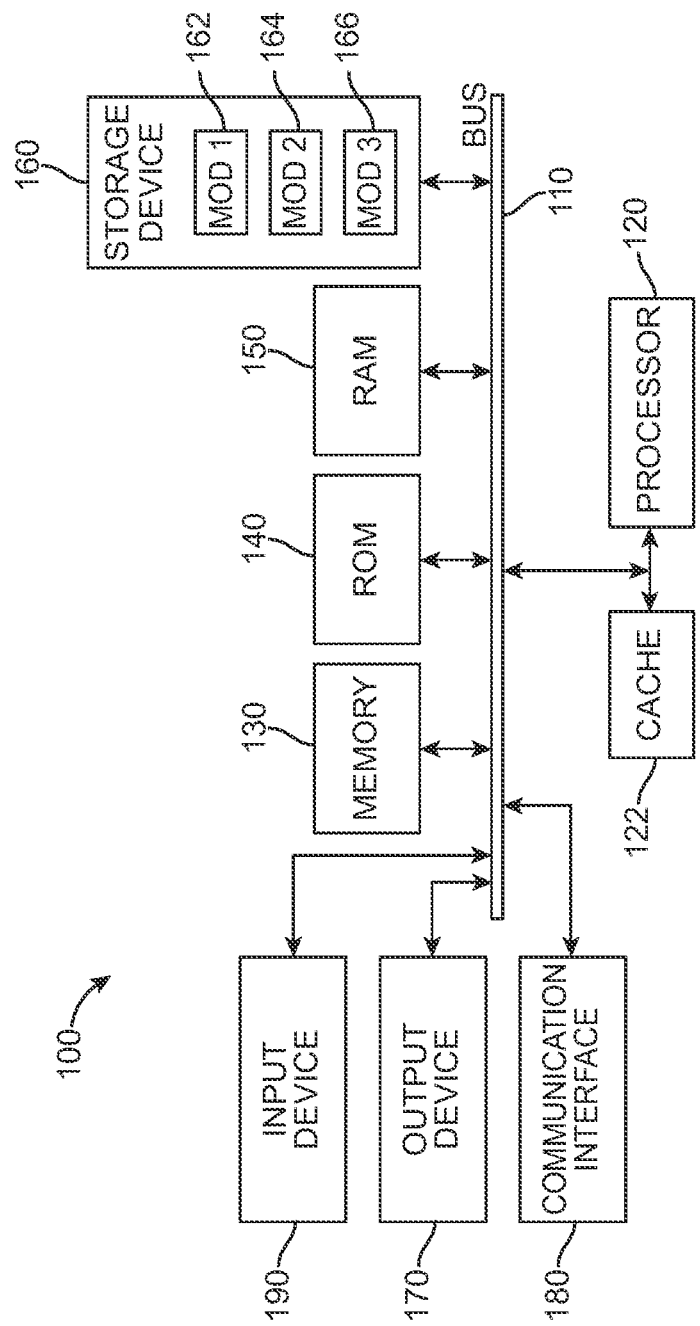
FIG. 1 illustrates an example system configuration.

Disclosed are a flying vehicle, system and method associated with managing a projectile deployment component. The present disclosure introduces a number of technologies associated with the projectile module configured on a flying vehicle, such as a drone. The technologies improve the reliability and the repeatability of utilizing a projectile from a drone to capture or immobilize another dangerous drone. Some of the improvements described herein represent innovations necessary to achieve reliable and repeatable operation over typical commercial guns. For example, when the projectile is a net, the net size, gas pressure, and release mechanisms of typical off-the-shelf net guns were not satisfactory for a drone application. Features that are described herein that represent improvements include a configuration and O-ring design associated with weights attached to corners of a net, an approach to wrapping the net and preparing the net for the projectile module, the string material, replaceable head cartridges, a gun configuration and other approaches to net optimization for capturing drones, and so forth. These various improvements will be addressed in this disclosure and any combination of individual features can be combined and claimed in various embodiments.

For example, utilizing the proper size of the net, a proper hole size for a deployment structure to hold the weights, and string material can result in low drag as the net is deployed and expands. One aspect of this disclosure involves a projectile model which models the characteristics of the net as it flies through the air with various environmental conditions such as air density, altitude, wind direction, and so forth. Accordingly, seeking to optimize the physical characteristics of the net is also a factor in how a net model would be developed and used in an analysis of current conditions when determining whether a drone should fire the projectile at a target. Various computer models have been developed to take into account the number of different factors in an analysis to determine whether and when to deploy a projectile to properly capture a drone.

A drone having a projectile module can follow a target device and can be constantly modeling what would happen if the projectile were fired at a given time. The modeling predicts the path the projectile, and includes a prediction of the movement in the future of the target device. Using a combination of projective path modeling, and the prediction of the target device path, the system will make timing determinations on when to fire the projectile and at what angle or vector direction.

An example method related to determining when to deploy the projectile includes receiving, at a flying vehicle, information associated with a target flying device, wherein the flying vehicle includes a projectile module containing a projectile. The method includes applying a projectile model which generates a probability value that the projectile, if fired from the projectile module, will hit the target flying device, the projectile model taking into account a wind modeling in an area around the flying vehicle based on an inference of wind due to a tilt of the flying vehicle, the wind modeling also considering one or more (1) how the projectile travels through air in which the air has a particular air density, (2) how the projectile travels through the air at a projectile deployment velocity and (3) a drag on the projectile as it travels through the air. When the probability value indicates that the projectile will hit the targeted device according to a threshold, the method includes firing the projectile at the target flying device. The projectile can include one or more of a net, a streamer, a pellet, a bean bag or an explosive. The projectile module can be attached to the flying vehicle in a fixed position or can have an adjustment component that can enable the projectile module to change its orientation relative to the flying vehicle. For example, the gun can be configured on a gimbal which enables controlled movement and pointing of the gun while attached to a drone.

The projectile model further can consider one or more of a flying vehicle position, a flying vehicle pitch, a flying vehicle yaw, a flying vehicle velocity, a target flying device manufactured specification, a target flying device current position, a target flying device velocity, a predicted path of the target flying device, and a wind velocity. Two, three or four or more of these features can also be included in the evaluation.

The projectile model can also evaluate an orientation of the flying vehicle or based on an orientation of the projectile module. In one aspect, the method can include applying the projectile model to generate a new orientation of the flying vehicle. The method can also include adjusting the orientation of the flying vehicle to the new orientation of the flying vehicle before firing the projectile from the projectile module. The method also can include reapplying the projectile model after adjusting the orientation of the flying vehicle.

In another aspect or example of the concepts disclosed herein, a method can include receiving, at a flying vehicle, an identification of a target flying device, wherein the flying vehicle comprises a projectile module containing a projectile and applying a projectile model which generates a determination which indicates whether, if fired from the projectile module, the projectile will hit the target flying device, the projectile model taking into account a wind modeling in an area around the flying vehicle based on an inference of wind due to a tilt of the flying vehicle. The approach takes into account drag and thrust on the motor and the equations can determine or infer the wind direction and speed based on the angle of the tilt. The wind can also be determined while the flying vehicle is moving, but in some cases not while it is turning. The system can also determine the wind speed as well as a direction of the wind based on evaluating the angle of the tilt and account for the drag and thrust of the motor as well. When the determination indicates that the projectile will hit the targeted device according to a threshold value, the method includes firing the projectile from the projectile module at the targeted flying device.

Another aspect includes a flying vehicle having a processor, a projectile component and a computer-readable storage medium storing instructions which, when executed by the processor, cause the processor to perform operations including receiving an identification of a target flying device and applying a projectile model which generates a determination which indicates whether a projectile, if fired from the projectile component, will hit the target flying device. The projectile model takes into account a wind modeling in an area around the flying vehicle based on an inference of wind due to a tilt of the flying vehicle. When the determination indicates that the projectile will hit the targeted device according to a threshold value, firing the projectile at the targeted flying device.

Another example includes the gun component and replaceable head cartridge as a combined system. The system in this regard includes a gun component configured to be removably and electro-mechanically attached to an object (such as a drone) in which the gun component has an attachment arm with a pin at a first end and an engagement flange at a second end. The gun component includes a cylindrical gas valve, a safety component configured on an exterior surface of the cylindrical gas valve, the safety component having an indented surface on a portion of the safety component, the indented surface complimentary to the engagement flange at the second end of the attachment arm, a splitter component configured adjacent to the cylindrical gas valve, the splitter component having an output opening for gas flow, typically through a plurality of openings, and an accumulation reservoir that communicates a gas from the accumulation reservoir to the cylindrical gas valve.

The system includes a removable projectile head cartridge configured with an engagement member for engaging with the attachment arm and the pin, wherein the removable projectile head cartridge includes a channel (open on both ends) that receives a weight at a first end of the channel such that the weight can be positioned for firing at a second end of the channel. A string connects the weight to a projectile contained within the removable projectile head cartridge. Upon attachment of the removable projectile head cartridge to the gun component, a channel opening (or a plurality of channel openings) in the channel aligns with the output opening(s) in the splitter component such that upon firing via an electrical signal from the object, gas is communicated from the accumulation reservoir, to the cylindrical gas valve, to the splitter component, through the output opening in the splitter component and to the channel opening to project the weight out the channel, causing the weight to pull the projectile out of the removable projectile head cartridge.

The safety component further includes a first arm and a second arm each attached to the portion of the safety component and a second portion of the safety component connected to the first arm and the second arm, the second portion having a safety flange positioned to block movement of an attachment component of the gun component in a first position of the safety component and an opening on the second portion for enabling the movement of the attachment component of the gun component in a second position.

The first position can coincide with the removable projectile head cartridge not being locked into engagement with the gun component. In one aspect, the first position coincides with the engagement flange not being aligned with the indented surface on the portion of the safety component. The second position can coincide with the removable projectile head cartridge being locked into engagement with the gun component. The second position can coincide with the engagement flange being aligned with the indented surface of the portion of the safety component.

The gun component further can include a first fixed member for engaging with a first receiving structure of the object and a second moveable member for engaging with a second receiving structure of the object, wherein the second moveable member is enabled to engage with the second receiving structure of the object according to a position of the safety component.

The position of the safety component can be variable as the safety component is rotated around the cylindrical gas valve. The removable projectile head cartridge can have an opening that is one of rectangular shaped, square shaped, or circular shaped. The projectile can include a net having four corners and wherein a respective string connects each respective corner to a respective weight of four weights.

The removable projectile head cartridge can include four channels, each receiving the respective weight of the four weights. In one aspect, the channel has a rifled configuration, and wherein the weight includes a swivel such that at least a portion of the weight can twist independent of a connection component to which the string is tied.

Another aspect of this disclosure can include claims directed to the removable head cartridge. An example removable projectile head cartridge includes a cup structure having a channel configured in a wall of the cup structure, the channel having a first opening at a lip of the cup structure and a second opening at a base of the cup structure, wherein a weight having a string attached is inserted into the first opening at the lip of the cup structure for movement to the second opening at the base of the cup structure in preparation for firing, wherein the string is also attached to a projectile held within the cup structure. An engagement member can be configured on an outer surface of the cup structure for engaging with a gun component via an attachment arm with a pin, the attachment arm and pin being configured on the gun component, wherein upon attachment of the removable projectile head cartridge to the gun component, the second opening at the base of the cup structure aligns with an output opening in a splitter component of the gun component such that upon firing via a signal from an electrical signal from an object to which the gun component is attached, gas is communicated from an accumulation reservoir on the gun component, to an cylindrical gas valve on the gun component, to a splitter component on the gun component, through the output opening in the splitter component and to the second opening at the base of the cup structure to project the weight out the channel, causing the weight to pull the projectile out of the removable projectile head cartridge.

The cup structure can include 2, 3, 4 or more channels, each respective channel receiving a respective weight. The channel can be rifled and the weight in this scenario can include a swivel that causes a portion of the weight to twist independent of a connection component of the weight to which the string is attached. A cover can protect the projectile within the cup structure, wherein the cover breaks upon firing the projectile. The weight can have a first end that is rounded and a second end having a sharp edge. In one aspect, a string attachment component is connected to the second end of the weight. The first end of the weight that is rounded can be inserted into the channel in preparation for firing. The removable projectile head cartridge can be made by a 3D printer or through injection molding.

DETAILED DESCRIPTION

The present disclosure relates to a projectile system for configuration on drone and in one example, contains a net the can be deployed for capturing an enemy drone. The net can be prepared and have a respective weight attached to each corner. Each weight can have an O-ring and be configured in a slot such that utilizing air pressure from a canister, and based on a modeling of the projectile and the environment around the enemy drone, a system operating on the drone will determine when to deploy the net to capture the enemy drone. The various details of this system are discussed herein.

As the system disclosed herein requires computing components, a general example computing system shall be disclosed in FIG. 1, which can provide some basic hardware components making up a server, node or other computer system. FIG. 1 illustrates a computing system architecture 100 wherein the components of the system are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different The processor 110 can include any general purpose processor and a hardware module or software module/service, such as service 1 132, service 2 134, and service 3 136 stored in storage device 130, configured to control the processor 110 as well as a special-purpose processor where software instructions are incorporated into the actual processor design. The processor 110 may be a self-contained computing system, for example, containing multiple cores or processors, a bus (connector), memory controller, cache, etc. A multi-core processor may be symmetric or asymmetric.

To enable user interaction with the computing device 100, an input device 145 can represent a variety of input mechanisms, such as a microphone for speech, a touch-sensitive screen for gesture or graphical input, a keyboard and/or mouse, e.g., for motion input and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and/or hybrids thereof.

The storage device 130 can include software services 132, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

It is noted that in one aspect, a computer or computers can be deployed upon a flying vehicle, such as a drone, or as part of a projectile module that is removably attached to a drone in which interfaces with the control system of the drone. The computer or computer devices may also be deployed as a separate control system which can communicate with a drone and/or a projectile module and/or projectile itself. Any wireless protocol is contemplated as being utilized for such communication.

Figure 2:
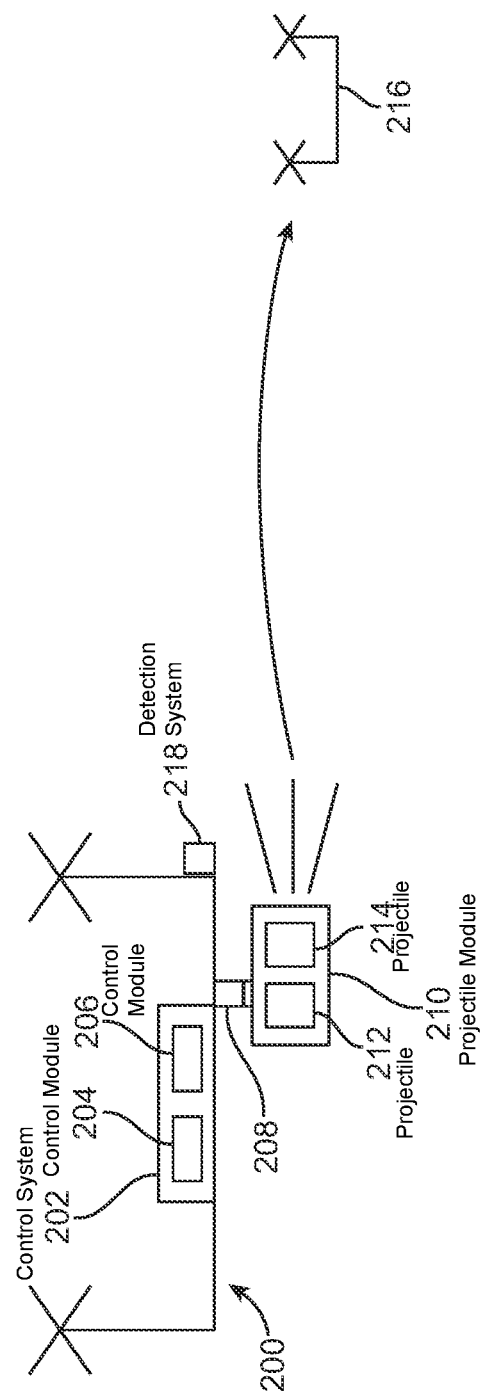
FIG. 2 illustrates an example flying vehicle having a projectile module.

FIG. 2 illustrates the overall system design is disclosed herein. The system includes a flying vehicle 200, such as a drone. The particular configuration of the drone can vary. While the term drone may be used herein, any flying vehicle that has the components disclosed herein, and performs the functions described herein can apply.

A control system 202 can be included on the flying vehicle 200 to control its operation. Control module 204, 206 can represent the various functions performed by the control system 202. For example, feature 218 can represent a radar or detection system that can identify a target device 216 that the drone 200 desires to engage with. The control system 202 can provide movement instructions, and receive feedback from various components 218 on the flying device 200. The flying device 200 also includes a projectile module 210 which is attached to the flying device 200 via an attachment module 208. The projectile module can be snapped into the attachment module 208 in a single connecting motion. For example, spring-loaded arms with steel dowels that can be perpendicular to an access of the launching direction and attached to ends can you be utilized to ramp on the projectile module 210 as it is connected and to hook it on when it is in place. A locking ring can be twisted in place to make sure that connecting arms cannot release the projectile until a ring is unlocked. The entire projectile module 210 can be attached to the drone and quickly detached as well. In one example, the projectile module 210 is held in a pistol grip and a trigger is squeezed to release the device from its amounts. Pogo pins can be used to quickly attach the gun electrically to the mount so that it is at once physically connected. It can also be configured to be electronically commanded to fire as described herein.

In one aspect, the projectile module 210 can include some or all of the computing capability necessary for running an algorithm to determine when to fire a projectile from the module. In one aspect, some computing can occur on the projectile module and some computing can occur on the flying vehicle. Wireless communication can occur between the flying vehicle and the projectile module 210 to communicate firing instructions according to any wireless protocol such as Near Field Communication or Bluetooth®. The projectile model can include a battery which can operate the electrical components including the solenoid which can cause the compressed gas to flow and project the projectile from the projectile module.

According to the present disclosure, any number of different mechanisms can be utilized to attach the projectile module 210 to the flying vehicle 200. The projectile module 210 includes a number of components 212, 214. These can represent multiple projectiles that can be contained within the projectile container new tab 210, or they can include a control mechanism, compressed gas, and so forth, which are more fully described herein and which embody the various features of the projectile module.

Figure 8:
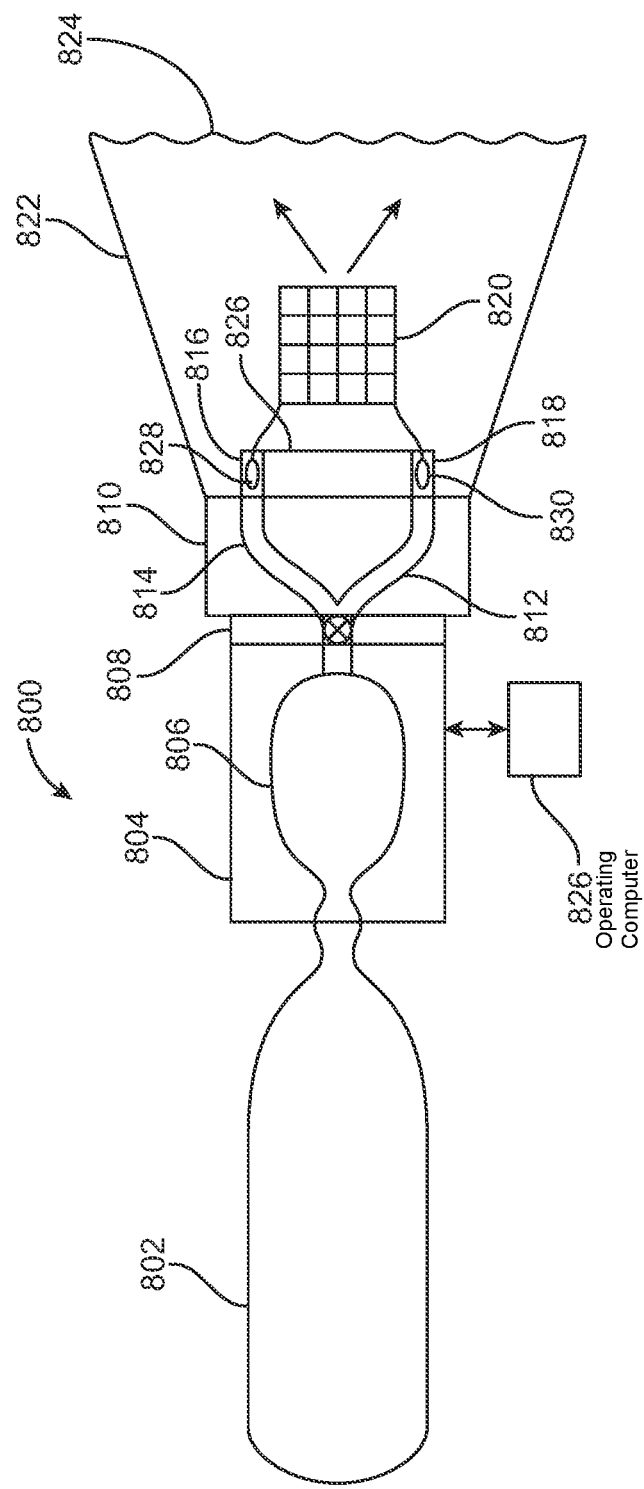
FIG. 8 illustrates the use of a compressed gas in the projectile module.

The flying vehicle or system 200 can also encompass the following features. The flying vehicle can include a processor 204 that is part of a computing device or control system 202. The flying vehicle can include a projectile component 210 and a computer-readable storage medium storing instructions 206 which, when executed by the processor, cause the processor to perform operations. The system 200 can include electrical communications between the control system 202 and the projectile module 210. These can be wired or wireless communications. For example, any wireless protocol such as Bluetooth can be utilized to communicate a triggering command from a control module 202 on the flying vehicle 202 to a projectile module 210. The triggering command is sent based on an evaluation model that takes into account the various components and factors described herein to determine when an appropriate time exists to fire the projectile. The latency associated with firing the projectile has to be low and custom electronics for high-speed electromechanical interactions are useful for reducing the latency between the determination by the computing model to fire the projectile and the actual firing the projectile. The triggering command can cause various components to deploy the projectile. FIG. 8 shows some of these components. A solenoid 808 to cause gas to flow from a reservoir 806 through channels 814, 812, into barrels 816, 818, which can cause the weights to travel from the projectile module 822 and at the target device.

The operations can include one or more of receiving an identification of a target flying device, applying a projectile model which generates a determination which indicates whether a projectile, if fired from the projectile component, will hit the target flying device. The projectile model takes into account one or more of a wind modeling in an area around the flying vehicle based on an inference of wind due to a tilt of the flying vehicle and a projected movement of the target flying device based on the identification of the target flying device. When the determination indicates that the projectile will hit the targeted device according to a threshold value, the system will fire the projectile at the targeted flying device.

Figure 3A:
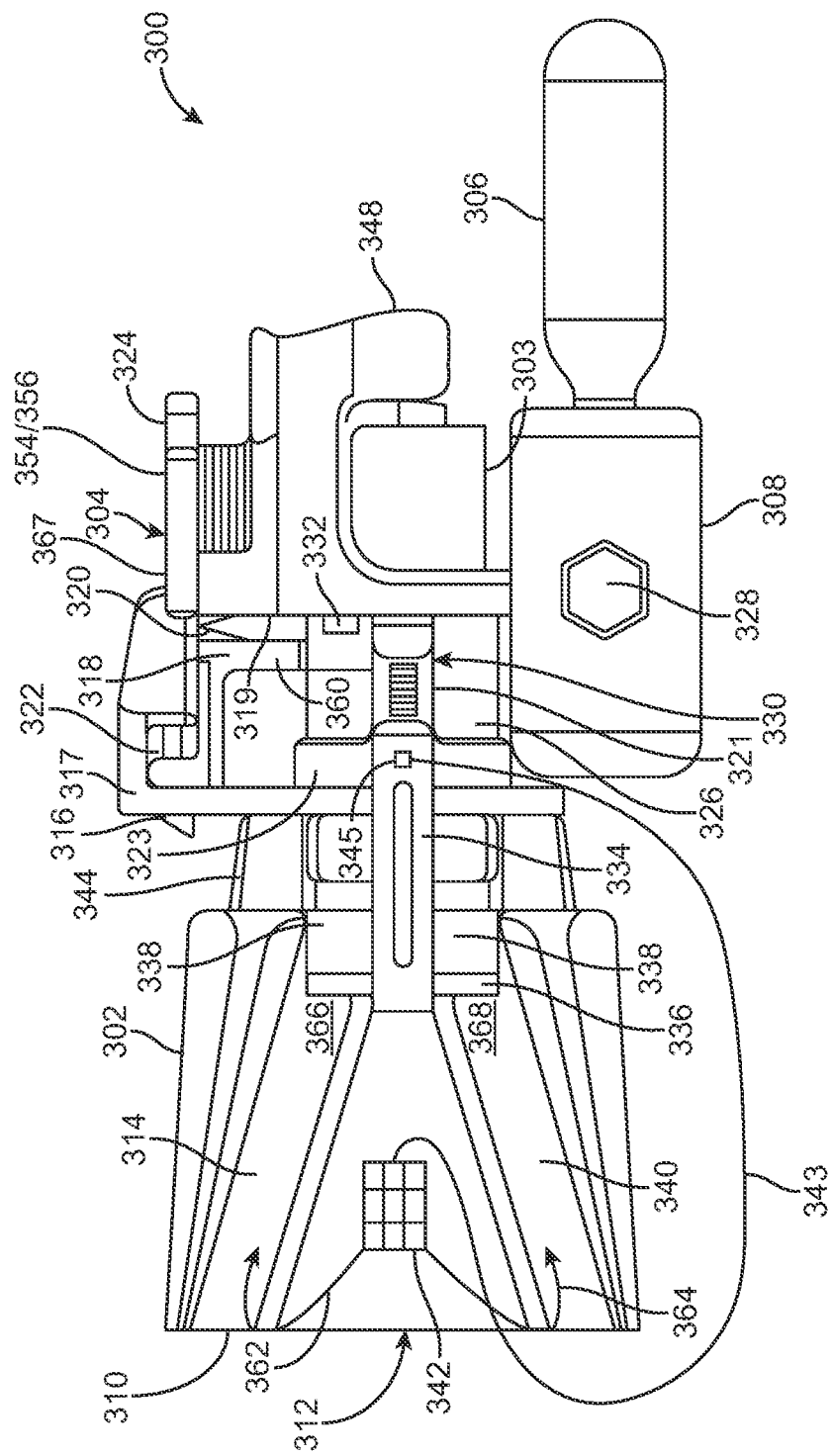
FIG. 3A illustrates an example projectile module attached to a gun base.
Figure 6:
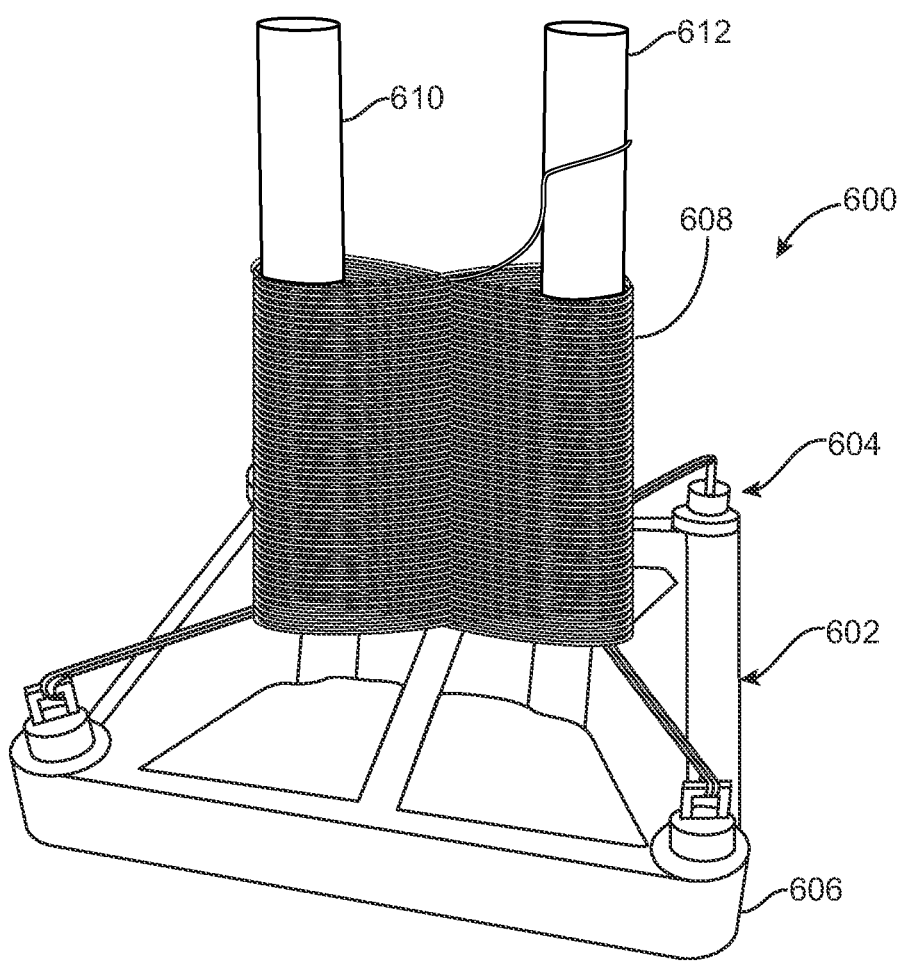
FIG. 6 illustrates a jig used to pack the net into the projectile module.

FIG. 3A illustrates an example structure associated with the projectile module 210 and which can include components of attachment module or gun 208/304. This can be called a gun component 304. Components 300 can include a first component 302 including a disposable net container that is prepared with a net or projectile using a tool or jig such as is shown in FIG. 6. One way of characterizing the first component is a cup structure in that there is an interior portion which receives the projectile and walls on all sides generally like a cup. The channels disclosed herein are configured in the walls of the cup in this characterization.

Figure 3B:
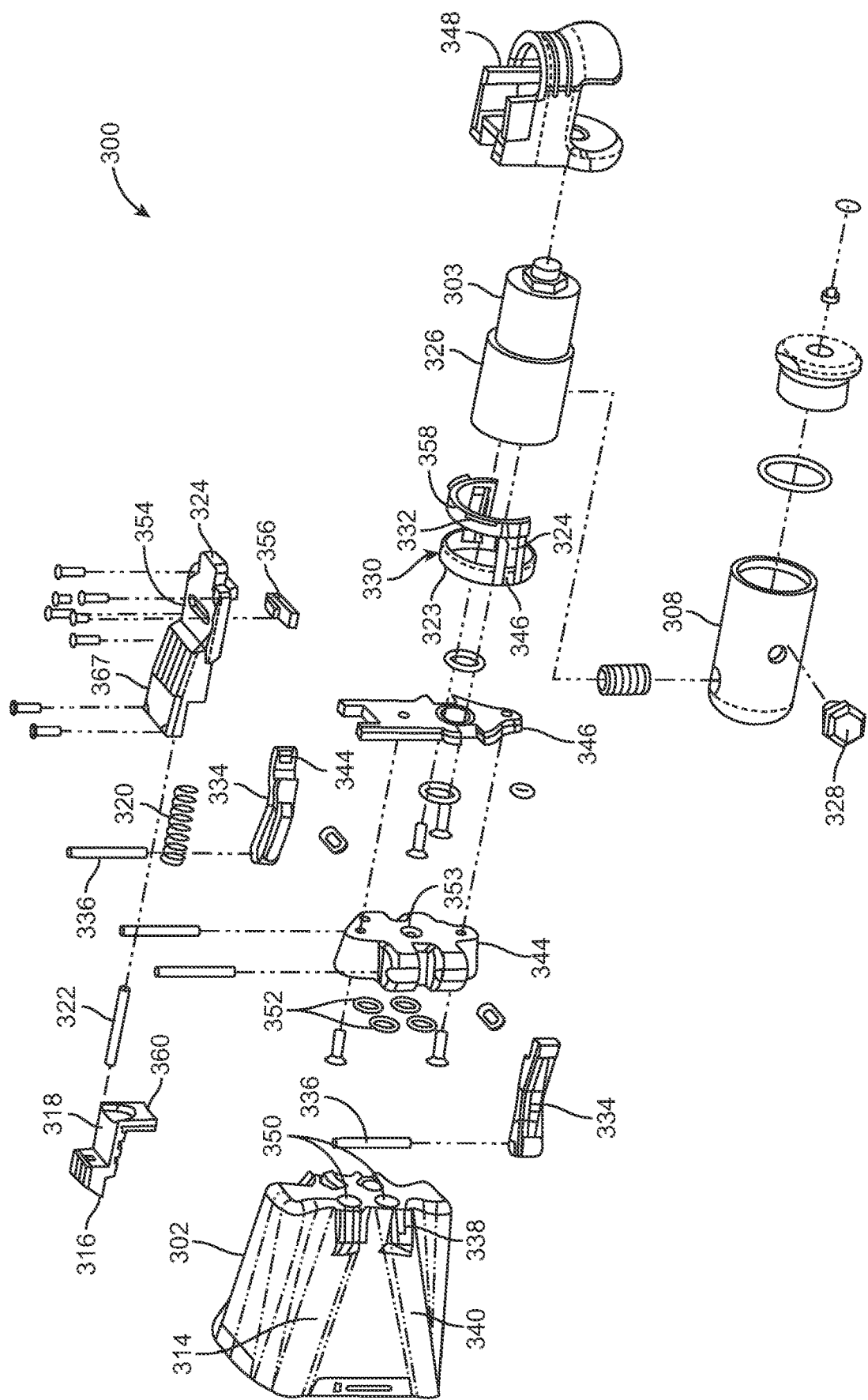
FIG. 3B illustrates an expanded view of the projectile module and gun base.

The first component 302 can also be characterized as a clip-on net head cartridge. It can be a single use cartridge or a multi-use cartridge. The overall system includes a gun portion 304 which is attachable to an object such as a drone and a removable/replaceable projectile module 302. The gun portion 304 includes a number of different components. The gun portion 304 can be attached to a structure configured under another object, such as a drone. To enable such attachment, a movable attachment component 318 is configured within a framework 317 on the gun portion 304. The attachment component 318 as well as other specific components discussed below are shown in FIG. 3A and FIG. 3B. A spring 320 is positioned between a portion 360 of the attachment component 318 and a top structure 366 of the gun portion 304. A rod 322 is also configured in connection with the attachment component 318 and the top structure 366 to guide the movement of the attachment component to enable a user to attach to gun to the object or detach the gun portion 304 from the object. To attach the gun portion 304 to an object, a person would move the attachment component 318 by using their finger to pull on the extension portion 360 so as to compress the spring 320. This would cause the attachment component 318 to move such that a securing member 316 moves to the right (according to the configuration in FIG. 3A) to a retracted position. With the securing member 316 in the retracted position, the user could engage the extending member 324 into a receiving opening on the object (drone, etc.) and then move the gun 304 upward into a locking position such that releasing the attachment component 318 causes the spring 320 to extend the securing member 316 to the left such that the gun 304 is locked into position.

In a locked position, the top component 367 will include an opening 354 and an electrical component 356, which can engage with an electrical connector on the object such that the object can trigger the firing of the projectile 342. An electro-mechanical connection between the gun 304 and the object 702 enables an easy approach of providing both the mechanical attachment as well as the ability to electrically communicate and control the gun 304 and projectile component 302 from the object. The electrical connection and mechanical attachment are achieved simultaneously in the single attachment motion disclosed herein utilizing, for example, spring-loaded pogo pins. A wireless communication could also be deployed using Bluetooth®, a near-field communication protocol, or any other protocol.

One aspect of the structure of the gun portion 304 is the ability to control when the user is able to move the attachment component 318. For example, it is preferable that the user be able to attach or detach the gun portion 304 only when the removable projectile module 302 is in a locked position. If the user is able to detach or attach the gun 304 to the object when the head cartridge 302 is not secure, it could fall or detach accidently due to the movement of the gun portion 304. To control the ability to remove the gun portion 304 from the object, a rotatable safety member 330 is included. The safety member 330 is configured to be positioned on the cylindrically shaped gas valve component 326. The safety member 330 has several characteristics which ensure that the user can only attach or detach the gun portion 304 when the projectile module 302 is locked in place or in certain other configurations.

The safety member 330 includes an indented portion 346 (shown in FIG. 3B) which is configured on one or both sides of the safety member 330. The indented portion 346 has a complementary shape to a flange 344 (shown in FIG. 3B) configured on the inner end of one or more securing arms 334. The securing arms 334 are configured to be biased in a closed position such that the pins 336 engage with engagement members 338 on the projectile module 302. The user will attach the projectile module 302 by engaging with the securing arms 334, and compressing an end of the securing arms having the flange 344 such that the removable projectile module 302 can be positioned as shown in FIG. 3A. To lock the projectile module 302 into place, the user releases the securing arms 334 and the pins 336 will engage with the engagement members 338 on the head cartridge 302.

The safety member 330 and its indented portion 346 will then engage with the flange 344 to lock the projectile module 302 into place. In this position, an opening 358 on the safety member 330 will coincide with the position of the member 360 such that when the user pulls on the member 360, the attachment component 318 can move so as to compress the spring 320 and enable the user to attach or detach the gun portion 304. As can be appreciated, when the safety member 330 is rotated around the cylinder 326 such that the indentation 346 is not engaged with the flange 344 such that the user can attach or remove the projectile module 302 by manipulating the attachment arms 334, a safety flange 332 is rotated into a position between the member 360 and a position 319 on the gun portion 304, so as to prevent the user from manipulating or moving the attachment component 318. This is because the component 360 will butt up against the flange 332, preventing the attachment component 318 from moving the attachment member 316 into a position of enabling attachment or detachment of the gun 304. It is noted that there may be two or more flanges 332 configured on the safety member 330.

Without the ability to move the attachment component 318, a user could not attach or detach the gun portion 304 from the object because the person would not be able to retract the member 316. As is shown in FIG. 3B, the safety member 330 can include in one aspect, a ring shaped component 323 and a first extension member 321 and a second extension member in opposite positions on the ring such that a semicircular component or portion of the safety member can attach to the first extension member 321 and the second extension member. Note that the semicircular component can include one or more of the flange 332, an opening portion 358 and another flange not shown. The semicircular shape shown in FIG. 3B is by way of example. The portion of the safety member 330 containing the flange 332 could also be circular as well. In another aspect, the portion of the safety component having the flange 332 could be ring-shaped, and the portion having the indentation 346 could be semi-circular. The functionality of the safety component 330 is that it is configured to rotate on the cylindrical valve 326 from a locked position to an unlocked position for the head cartridge 302. There are number of different structures which can be implemented to enable this functionality and one example structure is provided.

The first extension member 321 is thicker than the ring shaped component 323 for the following functionality. When in a locked position as shown in FIG. 3A, the first extension member 321 and the second extension member (not shown) are thick enough to prevent the user from being able to manipulate the attachment arms 334 to attach or detach the projectile module 302. However, when the safety member 330 is rotated such that the thinner portion of the ring shaped component 323 coincides with the ends of the attachment arms 334, there is enough space between the ends of the attachment arms 334 and the ring shaped component 323 such that the user can manipulate the attachment arms 334 and either attach or detach the projectile module 302.

The safety component 330 therefore operates in the following manner. The gun 304 can be attached to the object either (1) when a head cartridge 302 is attached to the gun 304 and the safety component 330 is locked in the position shown in FIG. 3A such that the structure 358 enables the component 360 to be moveable to attach or detach the gun 304; or (2) when there is no head cartridge 302 attached and the safety component 330 is also in the same position shown in FIG. 3A. If the head cartridge 302 is attached but the safety component is not locked into the proper position, such that the head cartridge 302 could be removable or could fall off, then the user cannot attach or detach the gun 304 due to the flange 332 preventing the movement of the component 360 against the spring 320. A sticker or an indication can be positioned on the cylinder 326 to inform the user regarding whether the head cartridge 302 is locked in position or not. The sticker/indication would be placed typically on the cylinder 326 behind the position of the arm 321 shown in FIG. 3A. The indication could be paint, ink, or any kind of marking to illustrate or inform the user regarding the status of the head cartridge 302. Thus, if the safety component 330 is rotated such that the arm 321 is either above or below the location shown in FIG. 3A, the configuration of the safety component 330 would reveal the notification (like a red dot) that the head cartridge 302 is not locked into position.

Other components of the gun portion 304 include a compression chamber, accumulation reservoir, or gas reservoir 308, having a pressure indicator or dial pressure gauge 328. A canister 306 of compressed air or $CO_2$ can be attached to the compression chamber 308. An intermediate chamber or gas valve 326 can receive the compressed air as controlled by the gun portion 304 such that, upon firing, the gas can flow into a splitter component 344 that splits the flow of gas from an intake portion 353 into two or more output channels represented by O-rings 352. The O-rings 352 or a rubber component for each opening is used to seal an opening on the splitter 344 with the respective opening 350 on the head cartridge 302. In other words, the other side of the splitter component 344 has two or more openings that are configured to coincide with the openings 350 on the projectile module 302. In a locked position in which the pins 336 lock with the engagement members 358, the O-rings 352 will provide an airtight channel between the exit openings on the splitter component 344 and the input openings 350 on the projectile module 302.

While separate O-rings 352 are shown as providing a seal between the component 344 and the openings 350, in another aspect, a single gasket can be used to seal the interface between the removable head cartridge 302 and the gas splitter 344. In some cases, individual O-rings can be susceptible to fall out. The single gasket can have four openings in a scenario where there are four channels for gas to flow. In another aspect, the gasket could be configured for a different number of openings as well. A single gasket which provides the sealing function can insure a more stable seal and the more simple manufacturing process then individual O-rings.

The gas reservoir 308 is used to ensure that there is a repeatable and consistent gas pressure at which the projectile is fired. When making the calculations regarding when to fire the projectile, the system needs to have a high confidence level in the gas pressure at which the projectile is fired. Otherwise, the speed at which the projectile is fired can vary or be inconsistent.

A component 348 can be attached to the gun portion 304 to protect some features of the gun 304 such as the gas valve component 326.

Figure 5:
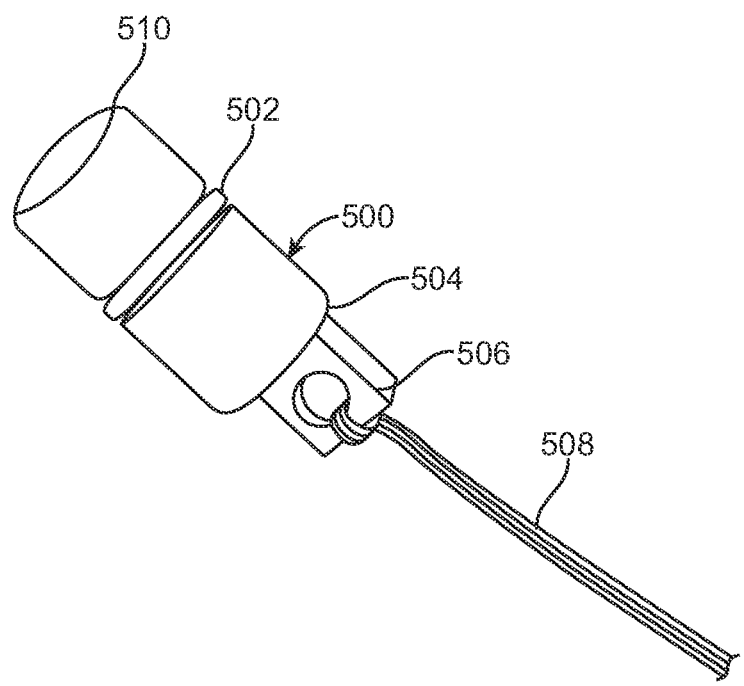
FIG. 5 illustrates an example weight associated with the projectile.

The projectile module or cup structure 302 includes a number of channels 314, 340, configured in the walls of the structure which receive weights as shown in FIG. 5. Each respective channel 314, 340 receives a weight such that a rounded end of each respective weight can be seen in the opening 350. The channels are configured within the walls of the cup or head cartridge 302 and each channel has openings at both ends. A first opening of the respective channel is used to receive the weight for insertion into the channel and to enable the weight to be shot or projected out of the channel. A second opening of the respective channel is used to enable the pressurized gas into the channel to push or force the weight through the channel and out the first opening. Feature 350 represents the respective second openings of each of the channels in the head cartridge 302. The respective weights will be positioned at locations 366, 368 shown in FIG. 3A. Each respective weight will have a line 362, 364 attached to it that is also attached on the other end to the projectile 342. When the system fires, the compressed gas will flow from a threaded inert gas bottle or canister 306 to the compression chamber 308 into the solenoid component 303 connected to a gas valve 326 and through an opening in the brackets 346 to the opening 353 in the splitting component 344 such that each opening 350 (which can include one, two, three, four, or more openings) will experience a high enough air pressure to cause the respective weights to travel quickly through the channels 314, 340, such that they break out of a breakable seal 310 on the projectile module 302. An electrical signal can be provided from the object to the electrical component 356, which can cause the solenoid 303 to activate and cause the firing the projectile. The moving weights will then pull the projectile 342 out of the opening 312 and towards the respective target. The solenoid 303 can be a coil wound into a tightly packed helix which can produce a uniform magnetic field in a volume of space when the electrical current is passed through it. This component can also be characterized as a solenoid valve which, when integrated with the component 326, will actuate the valve 326 to cause the gas to flow from the accumulation reservoir 308 through the valve 326 and the splitter component 344 the fire the projectile.

The weights that are used will fit within the channels 314, 340 at their position 366, 368 in a manner such that upon the application of the gas pressure from the component 344 and other components that the pressure will cause the weights to move down the respective channels 314, 340 at a predictable speed. The channels have respective openings at both ends. The O-rings 502 (see FIG. 5) around the weights can also provide the air seal to enable in the firing process. The material of the weights can be metal such as stainless steel but it can also be other materials as well such that the proper weight of each of the weights can be configured.

The firing direction 312 is shown and a sealing 310 can exist at an opening of the projectile module 302, which can be used to seal the first component for dirt or water ingress protection. For example, aluminum foil 310 can be used to cover the opening, which can easily be broken upon firing. Not shown is an optional string or line that can be attached to the projectile 342 at a first end and which can have a connector at a second end, which can be attached to the object or the drone. The optional string can then be used to retrieve the target object rather than merely causing the target object to fall to the ground.

It is noted that FIGS. 3A and 3B illustrate the projectile module 302. Another term for the projectile module 302 can be a single head cartridge. The cartridge could be 3D printed on site. For example, a customer could receive a drone and a gun component 304 with computer-readable configuration instructions for printing projectile modules or single head cartridges in the field using a 3D printer. Thus, in terms of a product-by-process embodiment, the product of the gun 304 having an attached projectile module 302 can include receiving a physical gun 304, as described herein, and receiving computer-readable instructions for instructing a 3D printer to create the projectile module 302 configured to receive the projectile and respective weights as described herein, and configurable to be removably attached to the gun. The cartridge could also be injection molded as well.

Other example configurations could include a dual launcher in which multiple gun components 304 can receive multiple head cartridges 302. In this configuration, the object to which the multiple components are attached to can be configured to provide an electrical signal to each respective unit so that multiple shots can be available. The overall system can also be configured to have more than two units such that three or more projectiles can be fired.

Figure 4:
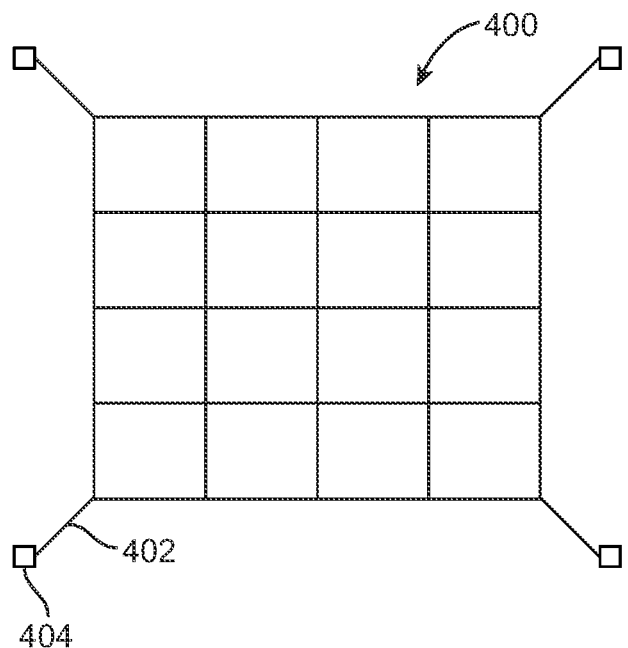
FIG. 4 illustrates an example projectile.

FIG. 4 illustrates a net 400 which can be used as a projectile. An example net is 3.2 m by 3.2 m square with approximately 40 cm spacing between the strings. Of course this represents only an example net configuration and this disclosure contemplates a number of different configurations. For example, the nets might be circular, oval, rectangular, or have a random or more complicated shape. The net in FIG. 4 includes corner component 402 are each attached to a weight 44. Each weight at a corner of the net has a certain configuration that will be discussed in FIG. 5.

An example net material is a 0.6 mm diameter Dyneema string. Other diameters and string material are also contemplated as well. In one example, each corner of the net has a tail that is used to attach a respective weight 404. The component 302 is configured to accept a variety of net sizes. For example, feature 212 can be of one size and feature 214 can represent another size. The net size described above with the 3.2 m×3.2 m square shape is considered one size that can catch a majority of target devices.

The number of weights also can vary. For example, if the net shape is circular, the system may deploy the net with three weights or five weights. More or less weights are also contemplated and can be included in the overall projectile design. The weights may be of the same weight and configuration or may be different weights or different configurations depending on the projectile model. For example, heavier weights on some edges can cause the net to travel through the air differently.

FIG. 5 illustrates an example weight 500. In one example, the weights are made of stainless steel, but other materials are also contemplated. An example weight is cylindrical in shape and has an O-ring groove 502 and a string attachment point 506. A distal end 510 of the weight has a preferable configuration of being rounded but could also be squared off as well. An O-ring 502 on the weight 500 is positioned to allow the weight to sit snugly in a respective channel 314, 340 at the proper position 366, 368. Having the respective weight fit within the net head cartridge 302 at the proper position provides a more powerful deployment of the projectile. Each respective weight's leading edge 504 is configured with a sharp corner or edge which lessons a likelihood of jamming the string (connected to the net or projectile) as the weight 500 travels through the channel 314, 340. A tail 508 attaches the weight 500 to a corner or a component of the net 400. A width of the string attachment point 506 is typically less than a width or diameter of the weight at point 504. The difference in width of these two portions of the weight 500 is purposefully designed to enable the deployment or the transition of the weight from point 366, 368 through the respective channel 314, 340 without the string 508 getting caught between the weight 500 and an interior surface or channel wall as the weight moves through the channel 314, 340. Having a rounded end 510 of the weight, with an O-ring 502 in the middle, and a sharp edge 504 at the other end of the weight 500 enables an improved process of firing the weight through the barrel or channel 314, 340 without the string 508 being tangled or fouled in the process.

There are a number of benefits of using an O-ring on the weight 500. For example, using the O-ring simplifies the manufacture of the weight 500 because it reduces the precision required. The O-ring can seal the gas upon firing and can physically retain the weight 500 in place so that it does not slide or move out of position. The O-ring is configured within a channel or groove that is in the outer surface of the weight 500 and which is configured to receive and retain the O-ring in place.

While the shape shown in FIG. 5 it is preferable for the weight, other configurations are contemplated as well. For example, a square or rectangular shape could also be applied. A swivel point for a rifled configuration could be between the weight at position 504 and the string attachment component 506. A swivel point could also be near a middle region such as where the O-ring 502 is configured. The weight could also be spherical in shape with an attachment component 506 configured at a location on the sphere.

One purpose of the O-ring 502 is to maintain the respective weight at its proper position 366, 368. If the weights are in different positions within a respective channel 314, 340, each respective weight could deploy at different speeds or different velocities, which can be problematic in that the system is determining a prediction of the path and speed of the projectile which includes an expectation of a consistent or expected speed of the weights as they deploy. Accordingly, the use of the O-rings 502 helps to ensure that the weights are in their proper and expected position 366, 368 within the projectile cartridge 302 prior to deployment.

In another aspect, the diameter of the weight 500, relative to the channel interior diameter 314, 340 can be close enough to prevent a respective weight from shifting or moving within the channel prior to firing. Accordingly, while the use of the O-ring 502 is beneficial, is not considered an essential feature.

In one aspect, the channels 314, 340 can be rifled such that helical grooves can be provided in a round bore. Any kind of rifling configuration of the barrels 314, 340 can be applied. In this aspect, the weights 500 can also be made to match the shape of the bore so that the respective weights would grip the rifle bore and spin in a certain direction. In one aspect, the weights 500 could include a swivel such that the string attachment point 506 can twist independent of the weight 500.

FIG. 6 illustrates a tool or jig used to prepare a net for insertion in the net head cartridge 302. Preparing a net (when a net is the projectile) involves configuring the net to be inserted into the cartridge 302 with the respective weights being pushed down the barrels 314, 340 into the proper respective position 366, 368 such that the net 342 deploys properly. This is not an easy process. Therefore, FIG. 6 shows an example tool for preparing the net for insertion into a head cartridge 302. Turning to FIG. 6, the net 608 rests in a container that has four barrels 606, one barrel being positioned at each corner of the net container 600. The barrel 606 is a hole or opening for a respective weight 604 attached to the net. The container 600 is removable from the projectile module 210. Each respective weight 604 is loaded into a respective barrel 606 and the net 608 is placed in between them in the container 600. Shafts 610, 612 can be used to position the net 608 in such a configuration that prevents the net from jamming as it is deployed. A shape of the net container 600 is shown to be square 602 in FIG. 6. But this is not an essential characteristic of the net container 600. For example, if the net were to have a circular configuration or triangular configuration, and three weights were used for a deployment, a shape 602 of the net, container 600 might be circular or triangular. The shape may also be circular if, for example, five weights were used. Thus, the particular shape of the net container 602 can vary depending on the shape of the net to be deployed or other factors.

The net 342 with the weight(s) attached and the head cartridge 302 can together be considered a removable or disposable single net shot. They can be traded out each time the device is used. For example, a disposable net head cartridge 302 can be used once or a number of times. Packing the nets to ensure that is that they deploy correctly and accurately is favorable. One reason to provide a removable or disposable single net shot is that customers who utilize the projectile modules will not want to pack them themselves and will want single shot disposable net containers that make it more simple to utilize the technology.

The head cartridge 302 can also have a number of different configurations. The example shown in FIGS. 3A and 3B are generally rectangular in configuration with four channels, each containing a single weight. The net head cartridge 302 could also have a square shape, or a circular shape or a nonsymmetric shape. Typically, the number of weights will be 4. However, in other configurations, the number of weights could be one, two, three, five, or more. The number of weights could depend on a shape of the projectile or other factors. For example, a triangular-shaped projectile could have 3 weights, wherein each point of the triangle has a respective weight. The channel configuration (314, 340) can also vary in number depending on the number of weights needed for a particular projectile configuration. For a 3 weight system, the head cartridge 302 can have 3 channels, and so forth.

Where the configuration of the head cartridge 302 changes, corresponding changes could be made to the gun 304. For example, the component 344 could be adjusted so that there are only 3 openings 352 if the configuration of the head cartridge 302 only had channels for 3 weights. In another example, the component 344 may have a fixed number of openings through which gas can flow and the head cartridge 302 may provide variable openings depending on its configuration. In this scenario, for example, the gun 304 may have a component with 5 openings with a respective O-ring 352 at each opening. Different head cartridge 302 configurations could be attached such that in one scenario, the head cartridge may have 5 openings with 5 weights in which each opening in the head cartridge 302 has a corresponding opening in the component 344. Another head cartridge 302 may have 3 or 4 weights and thus 3 or 4 openings. Such a head cartridge could be configured to align the 3 or 4 weights in their respective channels with appropriate corresponding holes in the component 344. A closed portion of the head cartridge 344 could seal off the other openings in the component 344 that do not have corresponding channels in the head cartridge 344 to maintain the necessary gas pressure in the system to fire the projectile.

Figure 7:
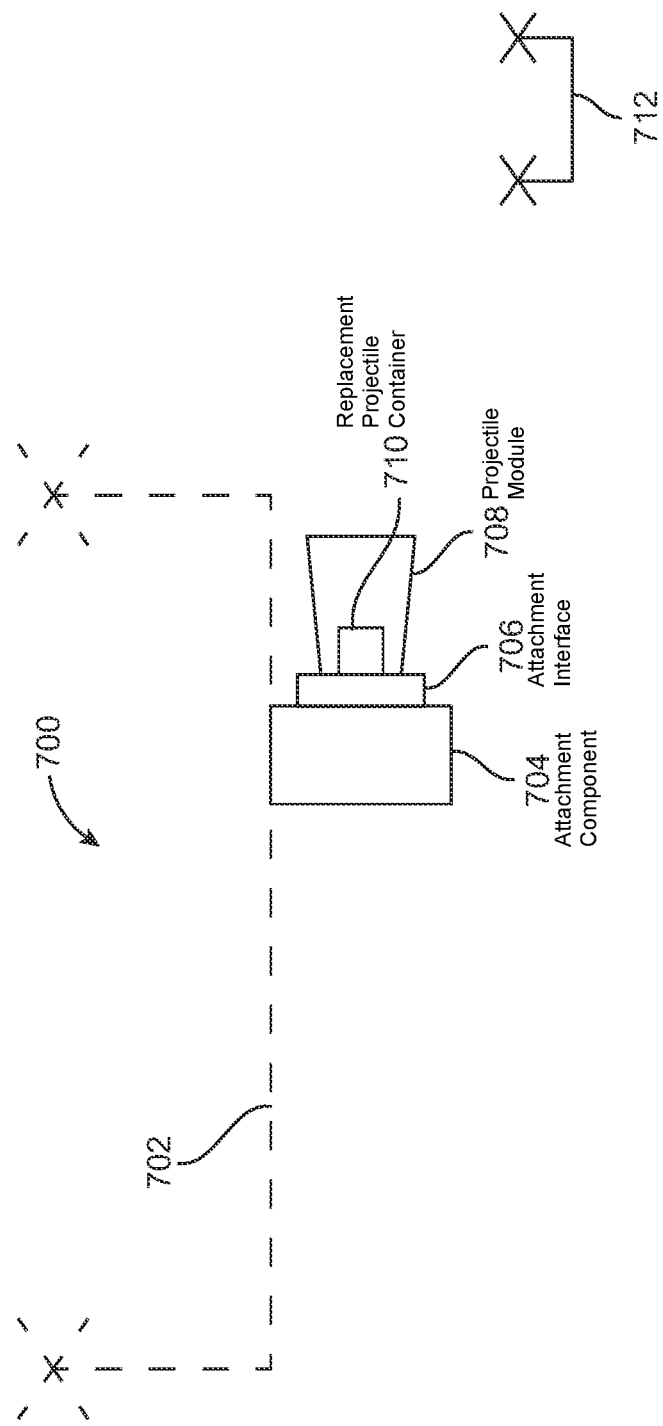
FIG. 7 illustrates the detachable nature of the projectile module.

FIG. 7 illustrates another example of a system 700 with a drone 702 having an attachment component 704 with an interface 706 between a projectile module 708 and a replaceable projectile container 710. In the example described herein, in which the projectile (net) has weights which are contained within barrels 606 as part of a projectile container, compressed air is used the fire the net. In one aspect, when the projectile 710 is fired, as disclosed herein, a string can be maintained at the drone 702 and the target drone can be captured by the net. In other words, a tether can be established such that rather than merely surrounding a target device with a net such that it falls from the sky, a capturing operation with a tether can be implemented. The drone 702 can then capture and carry a target drone down from the sky rather than having the target drone fall from the sky after it is covered by the net. The component 704 attached to the drone can also include mechanisms, such as a release mechanism so that the drone 702 could lower the captured drone down and release the tether at a safe elevation or the safe location. In this regard, a computer model that would be implemented to determine when to fire the net can take into account an identification of the target drone which can gather such features as its weight to determine whether the flying device 702 can capture and carry the target drone or not. In this regard, the computer model could also include a release mechanism in which it determines whether to capture the target drone and carry it to the ground via a tether or whether not to utilize the tether and simply fire the net at the target drone to take it out of the sky. Factors which can be taken into account include a weight of the target device, a perceived danger of the target device, whether the target device has a payload, and so forth. For example, if the target device is determined to have an explosive on board, the flying device 702 can, based on that determination, capture the target drone with the tether and carry it to a safe location for disposal or destruction. There can be a tether 343 for capturing the object (target drone) and a release mechanism 345 as well for releasing the captured object from the drone. The tether release mechanism 345 is shown at a particular location on the gun base 304 but can be located at any location in the overall system. The tether 343 can be connected to the projectile 342 at a first end and the tether release mechanism 345 at a second end. After capturing a target object, the system can retrieve the target object and use the tether release mechanism 345 to controllably drop the target object. For example, the drone can capture the target object using the projectile 342 and having the tether 343 attached to the projectile 342, can controllably lower down to the ground and at an appropriate height, can initiate the tether release mechanism 345 for dropping the target object on the ground. The tether release object can be electrically controlled through the signals provided physically 354/356 or wirelessly. The system could include the projectile module 302 having the tether 343 attached to the projectile 342 at the first end and a second end could be attached to an attachment component at the second end which is taped temporarily to the outside surface of the projectile module 302. The user then attaches the projectile module 302 to the gun base 304 and using the attachment component connected to the second end of the tether 343 to attach the tether to a tether release mechanism 345 located somewhere on the system.

Component 704 and/or 706 can also represent an adjustment module which can be utilized with just an orientation of the projectile module 708. For example, a target device 712 might be positioned at a certain angle relative to the drone 702. Computer algorithms operating on the drone 702 might determine that a particular orientation of the drone 702 is not optimal or preferable for firing the projectile 710 at the target drone 712. However, it might be preferable, given when conditions or other conditions, not to adjust the entire orientation of the drone 702, but only to adjust the orientation of the projectile module 708. In this scenario, adjustment components can be built into features 704 and/or 706 such that a command module on the drone 702 can utilize the determination or output from the computer algorithms associated with the various conditions as described herein, and instruct the component 704/706 to reorient the projectile module 708 in a more favorable orientation for the deployment of the projectile 710. After the reorientation, the computer models can take into account the new direction at which the projectile would leave the projectile module 708 and then make new determinations regarding when to fire the projectile at the target device 712.

FIG. 8 illustrates an example of how the component shown in FIG. 7 might be implemented in more detail. FIG. 8 illustrates a system 800, which can include some components that can be attached to a flying vehicle represented by feature 704 and/or 706 in FIG. 7 and other components which can be configured in a detachable way represented by features 708 and/or 710. In FIG. 8, a tank 802 contains compressed nitrogen for use in deploying the net 820. The tank is attached to feature 804 which enables nitrogen to be provided to a compression chamber 806. The system requires the gas to be compressed a certain pressure in order to adequately deploy the net. In one example, a separate chamber 806 is shown to ensure that the gas is compressed to the proper pressure. In another scenario, only the tank 802 is used in the pressure in the tank can be controlled by the system.

Feature 808 represents a solenoid valve or other valve that is used to trigger the launch of the projectile. The valve 808 can be attached to the reservoir 806 on the intake side and exits through the barrels 816, 818 in the projectile container 824. A distribution manifold 812, 814 exist between the solenoid valve 808 and the projectile container 824 to split the expanding nitrogen into multiple channels and directly to the net barrels 816, 818. The O-rings 828, 830 are shown on the weights contained within the barrels 816, 818. The O-rings seal all the connections between the parts and enable the projection of the net 820. The solenoid 808 can receive an electrical signal from an operating computer 826. The operating computer 826 is typically deployed on the flying vehicle 702 and has an electrical connection to the projectile module for enabling the transmission of the signals to fire. In general, the control system on the flying vehicle will perform the analysis utilizing the models described herein to determine, based on the various factors, the moment at which to fire the projectile.

It is preferable to improve compressed nitrogen be used in a disposable cartridge that can be used to launch the gun. Feature 306 represents an example of the disposable cartridge. Typically, each shot uses 1 cartridge. An aluminum reservoir 806 is represented that can have a puncture insert that can be used to attach the cartridge 802 to the projectile module and store an appropriate amount of gas at the right pressure to deploy the net. Ideally, the reservoir 806 might have or might be a cartridge itself. One incentive to use the reservoir 806 which can maintain the nitrogen at the appropriate pressure is the existence of nitrogen cartridges for purchase that can easily be used.

Figure 9:
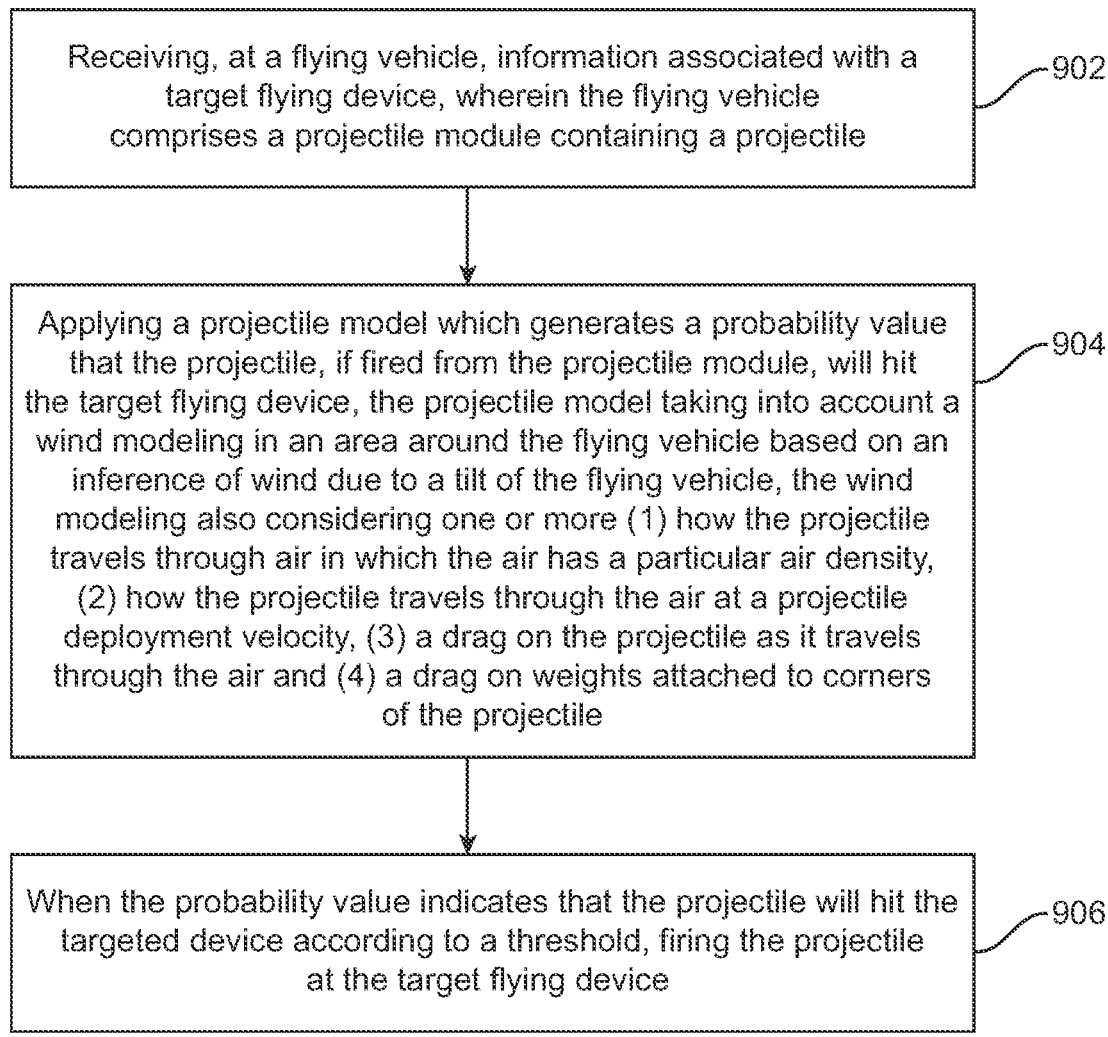
FIG. 9 illustrates a method embodiment.

This disclosure now turns to the method aspects and focuses on the computer models that have been developed to determine a timing associated with when to fire a projectile from a first flying device to a target device. FIG. 9 illustrates a method example. A method includes receiving, at a flying vehicle, information associated with a target flying device, wherein the flying vehicle comprises a projectile module containing a projectile (902), applying a projectile model which generates a probability value that the projectile, if fired from the projectile module, will hit the target flying device, the projectile model taking into account a wind modeling in an area around the flying vehicle based on an inference of wind due to a tilt of the flying vehicle, the wind modeling also considering one or more (1) how the projectile travels through air in which the air has a particular air density, (2) how the projectile travels through the air at a projectile deployment velocity, (3) a drag on the projectile as it travels through the air and (4) a drag on weights attached to corners of the projectile (904) and, when the probability value indicates that the projectile will hit the targeted device according to a threshold, firing the projectile at the target flying device (906).

The projectile can include one or more of a net, a streamer, a pellet, a bean bag, a weighted net having a weight attached to each corner, or an explosive. The projectile module can include one or more characteristics comprising: (1) being attached to the flying vehicle in a fixed position, (2) having a protective cover that is broken upon deploying the projectile, (3) containing two or more projectiles, and (4) having containers that store weights attached to the projectile. The projectile module may also include a tether component in which the projectile is fired, and a tether maintains a physical connection between the flying vehicle and the projectile. The projectile module can be attached to the flying vehicle and can include an adjustment component that enables the projectile module to change its orientation independent of a position of the flying. A control module can be configured on the flying device and have an electrical connection to the projectile module adjusts an orientation of the projectile module. The projectile model can further consider one or more of a flying vehicle position, a flying vehicle pitch, a flying vehicle yaw, a flying vehicle velocity, a target flying device manufactured specification, a target flying device current position, a target flying device velocity, a geographically defined safe area, known flying capabilities of the target flying device and a wind velocity. The projectile model can also take into account a target flying device characteristic in terms of whether to deploy a projectile that is tethered to the flying vehicle or not. The flying device characteristic can include such features as a weight of the flying device, a payload associated with the flying device, a danger identified or associated with the target flying device, a geographic area over which the flying device currently is or where it may travel, and so forth.

For example, if the target flying device appears to be containing a payload which is identified as an explosive, and the target flying device is near a restricted geographic area, such as a stadium, the flying vehicle may deploy a projectile with a tether attached to the flying vehicle, such that the flying vehicle captures the target flying device and can carry it to a safe location. This is of course desirable to avoid the target flying device from simply being surrounded by, and fall from the sky over a populated area, such as a stadium. The flying vehicle can include components which will be controllable by control system to either attach a tether to the projectile or detach a tether to the projectile prior to firing the projectile at the target flying device.

In one aspect, the model can take into account assumptions as well. For example, the computer model may assume that for one half of a second, the target device will fly in a straight line from its last known position and velocity. This assumption can be adjusted based on identification of the target device type, a determination of whether the target device is a danger and potentially likely to take evasive maneuvers, and so forth. In one example, the modeling of the predicted path can take into account the position, velocity and direction, and assumes that same direction for a small period of time. Of course, that time can vary from a fraction of a second to one or more seconds.

The projectile module can further consider one, two or more of the flying vehicle position, the flying vehicle pitch, the flying vehicle yaw, the flying vehicle velocity, the target flying device manufactured specification, the target flying device current position, the target flying device velocity, the geographically defined safe area, the known flying capabilities of the target flying device and the wind velocity.

Applying the projectile model can be performed based on an orientation of the flying vehicle. For example, the computing device or control system on the flying vehicle can determine, based on an orientation of the flying the vehicle, what the wind speed is. For the flying vehicle to maintain a stable position in a wind, it must tilt into the wind in order to take into account the wind. The models disclosed herein can utilize the information about the wind speed inferred from the tilt of the flying vehicle in its evaluation of the flight path of the projectile and the location of the target device. Utilizing the wind speed that is determined from the tilt of the flying vehicle can improve the accuracy of the timing of when to fire the projectile and achieve a successful engagement of the project with the target device.

The method can further include applying the projectile model to generate a new orientation of the flying vehicle. Adjusting the orientation of the flying vehicle to the new orientation of the flying vehicle can occur before firing the projectile from the projectile module. The flying vehicle can further reapplying the projectile model after adjusting the orientation of the flying vehicle. In another aspect, the orientation of the flying vehicle may remain the same, but an adjustment module can be configured to enable only a reorientation of the projectile module direction. Thus, if the flying vehicle is in a wind, for example, and is advantageous to the flying vehicle to maintain its orientation given the wind speed, the system can only adjust the orientation of the projectile module while maintaining the overall orientation of the flying vehicle and then fire the projectile. A gimbal can be configured between the flying vehicle and the projectile module.

Figure 10:
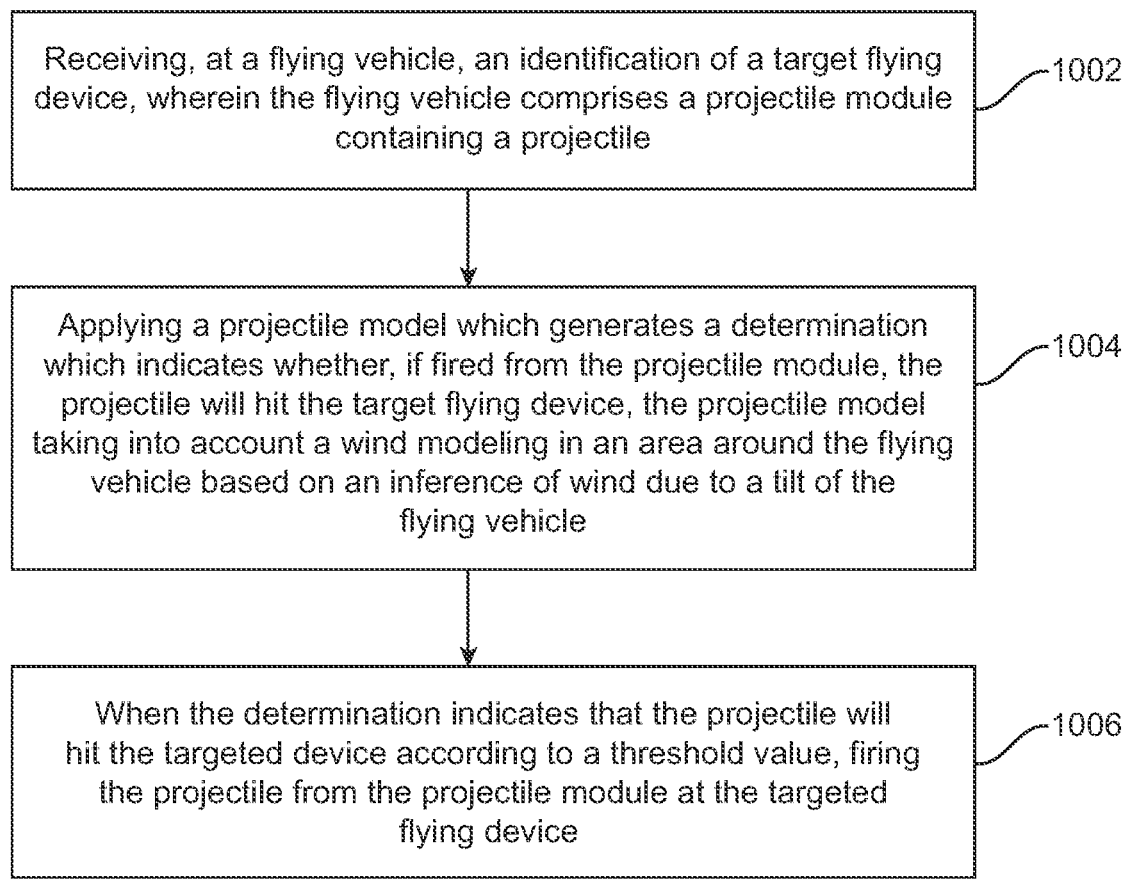
FIG. 10 illustrates another method embodiment.

FIG. 10 illustrates another example method embodiment. A method in this regard includes receiving, at a flying vehicle, an identification of a target flying device, wherein the flying vehicle includes a projectile module containing a projectile (1002), applying a projectile model which generates a determination which indicates whether, if fired from the projectile module, the projectile will hit the target flying device. The projectile model can take into account a wind modeling in an area around the flying vehicle based on an inference of wind due to a tilt of the flying vehicle (1004). When the determination indicates that the projectile will hit the targeted device according to a threshold value, the method includes firing the projectile from the projectile module at the targeted flying device (1006). The modeling can also include a combination of modeling of the projectile as well as a predictive algorithm regarding whether the projectile will interact with the target device.

The flying vehicle may have a first orientation. In this case, the method can further include, when the determination does not meet the threshold value at the first orientation, identifying a new orientation of the flying vehicle or a new orientation of only the projectile module attached to the flying vehicle at which the determination would meet the threshold value. The method can include reorienting the flying vehicle and/or the projectile module at the new orientation and firing the projectile from the projectile module on the flying vehicle at the new orientation. The method can include rerunning the projectile model at the new orientation to yield a new determination and when the new determination indicates that the projectile will hit the target flying vehicle within a second threshold value, firing the projectile from the projectile module. In this scenario, the threshold value can be one of the same as or different from the second threshold value.

The projectile model can take into account one or more of (1) how the projectile travels through air in which the air has a particular air density, (2) how the projectile travels through the air at a projectile deployment velocity and (3) a drag on the projectile as it travels through the air to yield the determination. It is noted that the drag on the projectile as it travels through the air can include an evaluation of both the material, size of material, and configuration of a net, for example, as well as the size and position of the weights attached to the net as described herein. The projectile can include one or more of a net or a weighted net having a respective weight attached to each corner of the net or in various locations on net if the net is circular. The projectile model can include a model of drag associated with a net deployment expansion as well as relative to wind. The projectile model can also take into account one or more of a projected path of the target flying vehicle and known navigation capabilities of the target flying vehicle. The projectile model can also apply net model parameters including how fast the projectile exits the projectile module upon firing, an air density, and an amount of drag on the projectile.

In another aspect, a flying vehicle may be equipped with a system that includes several projectiles of different types or of different sizes. For example, the projectile module can include a packet of pellets, taser electrodes, and/or a net. The computer model which evaluates the various factors disclosed herein can yield a determination regarding which type of projectile to project or which size of projectile to project. For example, two different net sizes and configurations can be deployed on a flying vehicle. The system may run one model or two independent models which take into account the different net characteristics, and thus the differences in how the two nets will deploy and expand, and travel through the air. Having different net configurations would yield different probabilities of whether each independent net would capture the target device. The computer models to take into account a potential danger associated with the target device and make a determination regarding which projectile to project first. For example, the system may determine to deploy the net having a larger diameter which will have a greater probability of capturing the target device. Other considerations such as the geographic location may be taken into account. For example, if the target device is a danger, and yet not over a populated area, the system may determine that rather than deploying the net, that a series of pellets or streamers would be projected to interrupt the propeller system of the target device and cause it to fall.

Again, the system may determine information about the type or indication of the target device and include in the algorithm data regarding a geographic area that is to be defended. The algorithm can take into account these various factors and make a triggering decision not only on a timing of when to trigger a projectile at the target device, but also optionally a type of projectile or a size of projectile to project. An algorithm can be implemented as part of the modeling to determine the physical navigational and speed capabilities of the target device, whether it is a bad actor, and whether it is likely to be directed to an area or geographic space to be defended.

In one aspect, where multiple projectiles are configured on the flying vehicle, a spare projectile can be included as a backup. In one scenario, the computer model will include in its evaluation the fact that a primary projectile and a backup projectile are available on the device. The thresholds that can be established for determining when to fire a projectile can therefore be taken into account, and adjusted based on the fact that a backup projectile exists. For example, if only a single projectile is available on the device, the system may have a higher threshold or require a higher probability of successful engagement prior to triggering the firing of the projectile. However, if a backup projectile exists, then a lower threshold of probability of success can be established before firing the first projectile. Adjustments can be made for the different capabilities of a primary projectile and a secondary projectile with respect to their respective models for triggering their deployment.

In one aspect, the projectile module includes two projectiles, like two nets. The system can implement different thresholds for different projectiles having different sizes or other characteristics. The system may select which projectile to shoot. For example, one projectile may have a bigger profile or smaller profile, based on all the factors. In one case, a drone may have an identification that enables the system to know its capabilities for navigation. That knowledge can indicate that to take down the drone will require a larger sized net to capture in case it moves or tries to evade. The system can also run two models each for a different projectile. One projectile can be pellets and the other can be a net and the model(s) determines which type of projectile to deploy and when.

Figure 11:
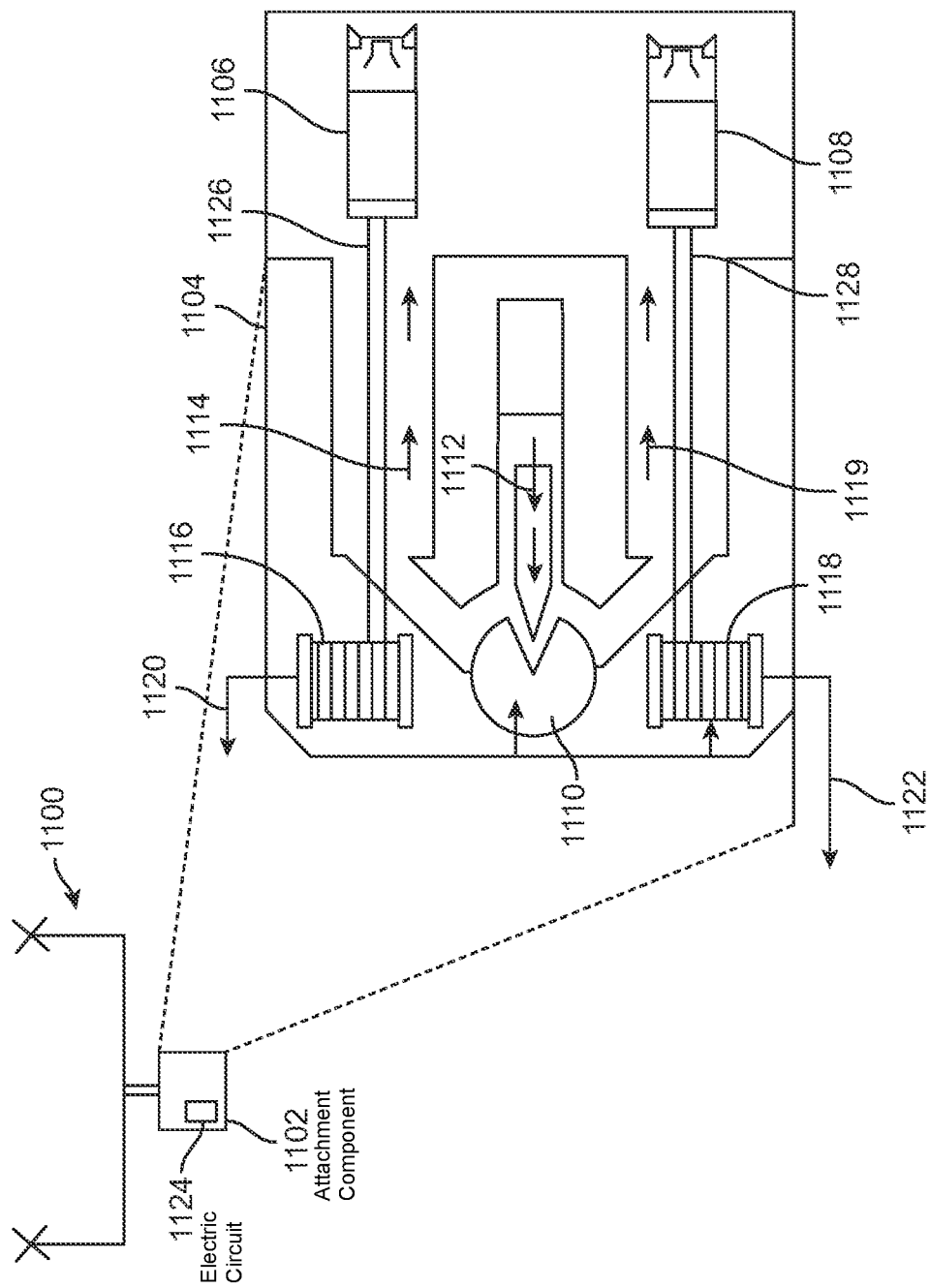
FIG. 11 illustrates a taser embodiment.

FIG. 11 illustrates a taser embodiment 1100. In this aspect, a system 1100 includes flying object, such as a drone having an attached component 1102, which includes taser components for shooting projectiles at a target device. In this scenario, the weights 1106, 1108 are attached to conducting wires 1126, 1128. Spools 1116, 1118 are used, to unwind or deploy the wires in a manner that they will deploy cleanly. The connecting wires are attached. 1120, 1122 to an electrical circuit 1124. When the system indicates or triggers the taser, a compressed gas cartridge 1110 can be broken or open 1112 such that the expanding gas can build pressure behind the weights 1106, 1108 launching them through the air. The weights 1106, 108 can be fixed with small barbs so that they can grab onto the target device. The weights in this scenario, act as electrodes attached to the target device. With the electrodes 1106, 10108 attached to the target device, the current travels from the circuit 1124 down the wires 1126, 1128 into the target object stunning or disabling it.

Just as the head cartridge 302 as described above, a replaceable taser cartridge could also be provided as well. A configuration could also include a net head cartridge 302, as well as a taser cartridge 1102 in the same overall system. The system could then include a determination algorithm regarding whether to fire and net or to fire a taser at a target object.'

Figure 12:
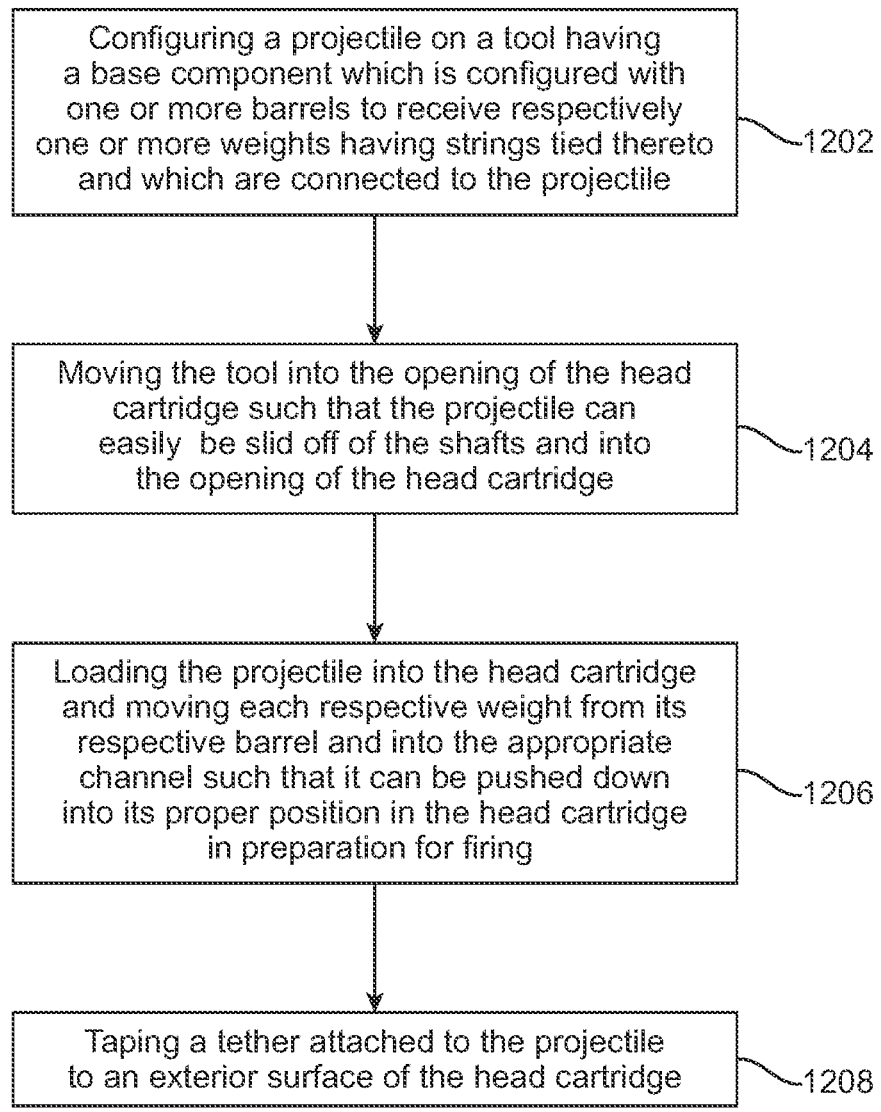
FIG. 12 illustrates another method embodiment.

FIG. 12 illustrates a method embodiment related to packing the head cartridge 302 with the projectile 342 using the tool or jig 600 shown in FIG. 6. The purpose of the tool 600 is to simplify the process of loading the projectile 608/342 into the head cartridge 302. The projectile 608/342, when it is a net, can easily become entangled and difficult to properly configure within the head cartridge 302. The tool 600 enables the user to easily prepare a configuration of the projectile 608/342 for inserting into the head cartridge 302. The method is as follows. A user configures a projectile 608 on a tool having a base component 602 which is configured with one or more barrels 606 arranged to receive respectively one or more weights having strings tied thereto and which are connected to the projectile 608 (1202). The barrels are like cups or openings that are configured to receive the respective weights for holding in a proper position while the user can configure the projectile on one or more shafts 610, 612. With the projectile 608 prepared on the tool 600, the user can then bring the tool 600 into or near the opening 312 of the head cartridge 302 such that the projectile 608 can easily be slid off of the shafts 610, 612 and into the opening of the head cartridge 302 (1204). This process maintains the organized configuration of the projectile 608 as it is loaded into the head cartridge 302. The user can then easily move each respective weight 604 from its respective barrel 606 and into the appropriate channel 314, 340 such that it can be pushed down into its proper position 366, 368 in preparation for firing (1206). Where a tether 343 is attached to the projectile 608, the tether can be prepared utilizing the shafts 610, 612. An end of the tether can have an attachment component tied to it such that it can be taped to an exterior surface of the head cartridge 302 (1208) or at some other location. The method can include any one or more of the steps outlined in FIG. 12. For example, step 1208 is optional in that some projectiles 608 will not have a tether attached thereto and thus that step is optional.

The tool 600 can be used to organize the projectile 608 as well as a tether 343 together. In other words, the projectile 608 configured in an organized fashion on the shafts 610, 612 can also include the tether 343 also configured or organized in connection with the shafts 610, 612 such that the entire package of the projectile and the tether can be easily slid into the opening of the head cartridge 302 in preparation for firing.

In some embodiments, the computer-readable storage devices, mediums, and or memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. Any token or structure/function disclosed herein can apply to a tokenized asset offering or a security token offering.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media conveying such instructions, computing resources for executing them, and other structures for supporting such computing resources are means for providing the functions described in these disclosures.

Although a variety of examples and other information were used to explain aspects within the scope of the appended claims, no limitation of the claims should be implied based on particular features or arrangements in such examples, as one of ordinary skill would be able to use these examples to derive a wide variety of implementations. Further, although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment," "variation," "aspect," "example," "configuration," "implementation," "case," and any other terms which may connote an embodiment, as used herein to describe specific features of configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other in any combination.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates the one member of the set or multiple members of the set satisfy the claim. For example, claim language reciting "at least one of A, B, and C" or "at least one of A, B, or C" means A alone, B alone, C alone, A and B together, A and C together, B and C together, or A, B, and C together.

The invention claimed is:

1. A flying vehicle comprising:
   a processor;
   a projectile module that contains a projectile; and
   a computer-readable storage medium storing instructions which, when executed by the processor, cause the processor to perform operations comprising:
      applying a projectile model which generates a determination which indicates a probability of whether, if fired from the projectile module, the projectile will engage with a target device, wherein the projectile comprises one or more of a net, a streamer, a pellet, a bean bag, a weighted net having a weight attached to each corner, or an explosive; and
      when the determination indicates that the projectile will hit the target device, firing the projectile at the target device.

2. The flying vehicle of claim 1, wherein the projectile model takes into account one or more of a wind in an area around the flying vehicle and a projected movement of the target device based on an identification of the target device.

3. The flying vehicle of claim 2, wherein the wind model is based on an inference of wind due to a tilt of the flying vehicle.

4. The flying vehicle of claim 2, wherein the wind model considers one or more of: (1) how the projectile travels through air in which the air has a particular air density, (2) how the projectile travels through the air at a projectile deployment velocity, (3) a drag on the projectile as it travels through the air and (4) a drag on weights attached to corners of the projectile.

5. The flying vehicle of claim 1, wherein the projectile module is removable from the flying vehicle.

6. The flying vehicle of claim 1, wherein the projectile module comprises one or more characteristics comprising: (1) being attached to the flying vehicle in a fixed position, (2) having a protective cover that is broken upon deploying the projectile, (3) containing two or more projectiles, and (4) having containers that store weights attached to the projectile.

7. The flying vehicle of claim 1, wherein the projectile module is attached to the flying vehicle and comprises an adjustment component that enables the projectile module to change its orientation independent of a position of the flying vehicle.

8. The flying vehicle of claim 1, wherein a control module adjusts an orientation of the projectile module.

9. The flying vehicle of claim 1, wherein the projectile model further considers one or more of a flying vehicle position, a flying vehicle pitch, a flying vehicle yaw, a flying vehicle velocity, a target device manufactured specification, a target device current position, a target device velocity, a geographically defined safe area, known flying capabilities of the target device and a wind velocity.

10. The flying vehicle of claim 9, wherein the projectile model further considers two or more of the flying vehicle position, the flying vehicle pitch, the flying vehicle yaw, the flying vehicle velocity, the target device manufactured specification, the target device current position, the target device velocity, the geographically defined safe area, known flying capabilities of the target device and the wind velocity.

11. The flying vehicle of claim 1, wherein applying the projectile model is performed based on an orientation of the flying vehicle.

12. The flying vehicle of claim 11, wherein the computer-readable storage medium stores additional instructions which, when executed by the processor, cause the processor to perform operations further comprising:
   applying the projectile model to generate a new orientation of the flying vehicle.

13. The flying vehicle of claim 12, wherein the computer-readable storage medium stores additional instructions which, when executed by the processor, cause the processor to perform operations further comprising:
   adjusting the orientation of the flying vehicle to the new orientation of the flying vehicle before firing the projectile from the projectile module.

14. The flying vehicle of claim 11, wherein the computer-readable storage medium stores additional instructions which, when executed by the processor, cause the processor to perform operations further comprising:
   reapplying the projectile model after adjusting the orientation of the flying vehicle.

15. A projectile module, the projectile module removably attachable to a flying vehicle, the projectile module comprising:

a projectile, wherein the projectile comprises one or more of a net, a streamer, a pellet, a bean bag, a weighted net having a weight attached to each corner, or an explosive;

a receiving structure used for storing the projectile; and an attachment structure for attaching the projectile module to the flying vehicle, wherein, when attached to the flying vehicle, the projectile is fired upon receiving a signal from a control system of the flying vehicle, the control system applying a projectile model which generates a determination which indicates a probability of whether, if fired from the projectile module, the projectile will engage with a target device.

16. The projectile module of claim 15, wherein the projectile module further comprises protective cover over the projectile that is broken open upon deploying the projectile.

17. A projectile for being configured within a projectile module that is removably attachable to a flying vehicle, the projectile comprising:

a net configured to be placed within a first receiving cavity of the projectile module;

a first weight attached to a first portion of the net, the first weight configured to be placed within a second receiving cavity of the projectile module; and a second weight attached to a second portion of the net, the second weight configured to be placed within a third receiving cavity of the projectile module, wherein, upon a firing action from the flying vehicle when the projectile module is attached to the flying vehicle, the projectile is fired from the projectile module.

18. The projectile of claim 17, further comprising:

a third weight attached to a third portion of the net, the third weight configured to be placed within a fourth receiving cavity of the projectile module; and a fourth weight attached to a fourth portion of the net, the fourth weight configured to be placed within a fifth receiving cavity of the projectile module.

* * * * *